C. H. Haskins.
Railroad Car Ventilator.

No. 71385 — Patented Nov. 26, 1867.

Witnesses
Martin Collins
John F. Randall

Inventor
Ch. H. Haskins

United States Patent Office.

CHARLES H. HASKINS, OF ST. LOUIS, MISSOURI.

*Letters Patent No. 71,385, dated November 26, 1867.*

RAILROAD-CAR VENTILATOR.

The Schedule referred to in these Letters Patent and making part of the same.

TO ALL WHOM IT MAY CONCERN:

Be it known that I, CHARLES HAMILTON HASKINS, of St. Louis, in the State of Missouri, have invented a new and useful Improvement on the present Plan of Ventilating Passenger-Cars and other public conveyances; and I do hereby declare that the following is a full, clear, and exact description of the construction and operation of the same, reference being had to the annexed drawings, making a part of this specification, in which—

Figure 2:
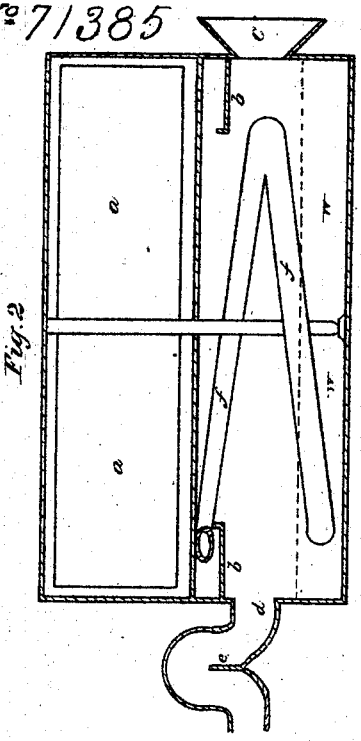
Figure 4:
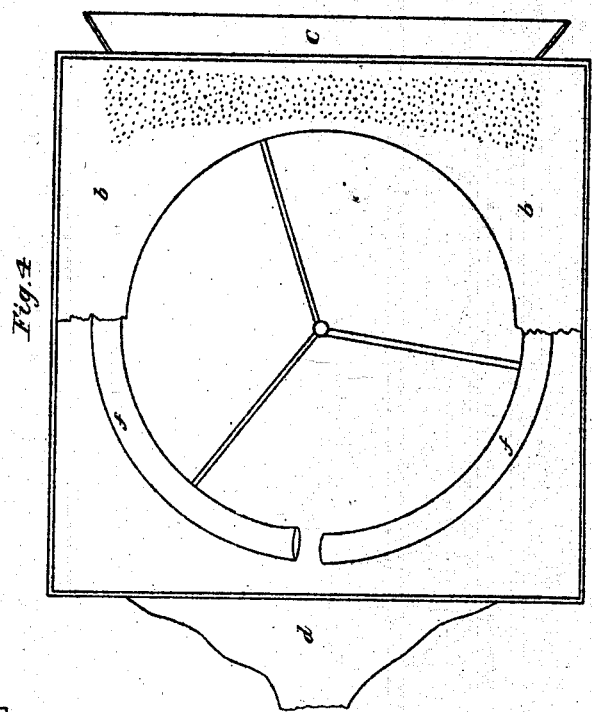
Figure 1:
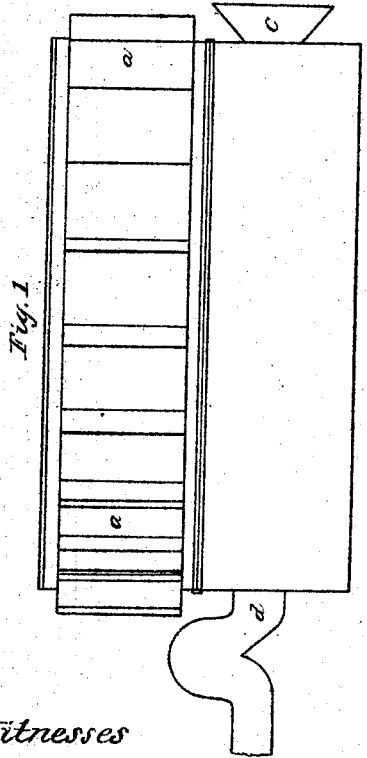
Figure 3:
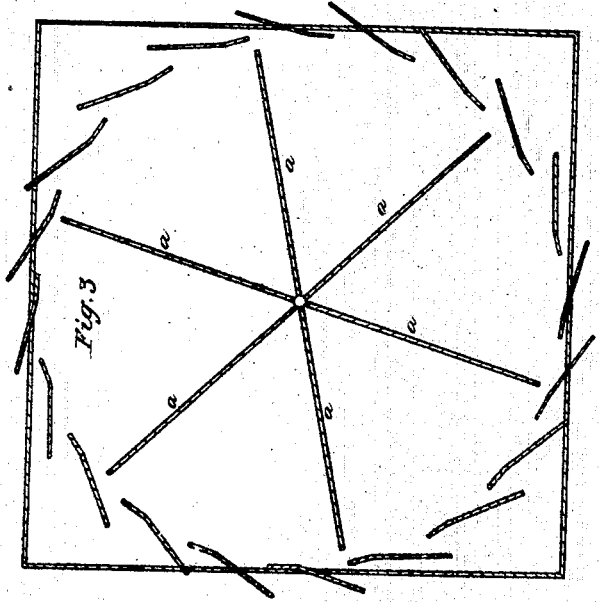

Figure 1 is a perspective view of the whole machine.
Figure 2 is a longitudinal section showing the internal arrangement and construction of parts.
Figure 3 is a plan of the upper part or windmill.
Figure 4 is a plan of the lower part showing eaves-trough.

In each of these, $a$ represents the windmill; $b$ the eaves-trough; $c$ the inlet for ventilating the air; $d$ the outlet-pipe for purified air entering the car; $e$ the partition to prevent the water from being thrown out of the box; $f$ the worm or screw-pipe; $w$ the water, &c.

The nature of my invention consists of a water-tight box, of any material, divided horizontally into two compartments, the lower to contain water for the purpose of cleaning the air before it is introduced into the car or conveyance; the upper compartment containing a windmill, to which is attached a screw-pipe or worm, extending down into the water below, by whose rapid motion the water is carried up and emptied upon an eaves-trough, $b$, surrounding the upper part of the lower box or compartment. This eaves-trough being perforated with holes, permits the water to fall again in drops, so that the air passing through the inlet $c$ and the outlet $d$, is washed and divested of all dust and smoke, and permitted to enter the cars perfectly pure and fresh. The lower compartment is furnished also with projecting riffles on the bottom and sides, to check and prevent any current or violent agitation of the water.

I do not claim the use of water for washing and purifying the air; neither do I claim the use of a windmill for raising or moving the water. I also disclaim as my own invention the use of a worm or screw-pipe by which the water is raised.

But what I do claim as my invention, and desire to secure by Letters Patent, is—

1. The use of an eaves-trough or its equivalent, to hold the water when raised, allowing it to fall in sheets or drops in quantity as required, as and for the purposes set forth.

2. I claim the combination of the windmill, the worm or screw-pipe, and the eaves-trough, or their equivalents, substantially as described for the purpose herein set forth.

CH. H. HASKINS.

Witnesses:
GEO. W. J. KARRICK,
E. H. STEVENS.